United States Patent Office 3,038,796
Patented June 12, 1962

3,038,796
PRODUCTION OF ANHYDROUS BARIUM CHLORIDE
Frank Pitts, Manchester, England, assignor to Magnesium Elektron Limited, Clifton Junction, near Manchester, England
No Drawing. Filed Feb. 15, 1960, Ser. No. 8,492
Claims priority, application Great Britain Feb. 27, 1959
8 Claims. (Cl. 75—93)

This invention relates to the production of anhydrous barium chloride and of anhydrous compositions containing barium chloride, together with one or more alkali metal chlorides and/or one or more other alkaline earth metal chlorides.

Barium chloride, usually in conjunction with alkali metal chlorides and/or alkaline earth metal chlorides, is used in the metallurgical processing of magnesium alloys. For such purpose it is important that the barium chloride or the barium chloride-containing composition should have very low oxygen and hydrogen contents.

The most readily available commercial form of barium chloride is the dihydrate ($BaCl_2.2H_2O$). It is derived from the naturally-occurring mineral barytes (natural barium sulphate) or witherite (natural barium carbonate). Conversion of barium chloride dihydrate to the anhydrous salt by customary methods of drying at elecated temperature either does not effect sufficiently complete removal of water or it results in excessive hydrolysis, the dried product in both cases containing too much oxygen. Such oxygen content is a serious disadvantage in the production of magnesium alloys which utilises barium chloride or barium chloride-containing compositions.

The principal object of the present invention is to provide a simple method of preparing from barytes, anhydrous barium chloride of very low oxygen and hydrogen contents or anhydrous compositions of very low oxygen and hydrogen contents containing barium chloride, together with alkali metal chlorides and/or other alkaline earth metal chlorides.

According to our invention gaseous chlorine is passed, in the presence of a carbonaceous substance, through a solution and/or suspension of barytes in a molten material consisting of one or more of the chlorides of alkali metals and alkaline earth metals. For example, the material may be barium chloride, one or more alkali metal chlorides, one or more alkaline earth metal chlorides (which may include barium chloride), or mixtures of one or more alkali metal chlorides and one or more alkaline earth metal chlorides. The reaction is conducted at a temperature sufficiently high to maintain the reaction mass in the fluid state and chlorination is continued until the conversion of barium sulphate to barium chloride is complete. The carbonaceous material may be carbon or graphite.

The chlorination reaction takes place whether the carbon be present in massive or powdered form, or as amorphous carbon or graphite, but it proceeds more rapidly with powdered than with massive carbon. It is preferable to use graphite carbon because it avoids the occurrence of frothing often associated with the use of powdered amorphous carbon. Carbonaceous material such as ground anthracite or coke may be used as the source of carbon but the reaction product is less pure than that obtained by using graphite.

It is customary in the metallurgical processing of magnesium alloys to use barium chloride in association with potassium chloride. It is most convenient, for such applications, to use the process of the present invention for the manufacture of anhydrous compositions of barium chloride and potassium chloride. The melting points of such compositions are lower than that of barium chloride and the chlorination reaction may therefore advantageously be conducted at lower temperatures.

If desired, the molten material may be barium chloride whereby the reaction product is anhydrous barium chloride.

Alternatively, the molten material may be potassium chloride or a mixture of barium chloride and potassium chloride and the proportion of barytes used may be such that the reaction product is a mixture of barium chloride and potassium chloride and contains 50% to 90% of barium chloride.

According to another alternative process, the molten material is sodium chloride or a mixture of sodium chloride and barium chloride.

In a still further alternative process the molten material is a mixture of magnesium chloride and potassium chloride or a mixture of magnesium chloride, potassium chloride and barium chloride.

Example I

A current of chlorine is passed into a fused melt of 4 parts by weight of barium chloride and 6.5 parts by weight of potassium chloride at a temperature of 800° to 850° C., one or more blocks of carbon being immersed in the melt. A mixture of 25 parts by weight barytes crushed to pass a three-eighths inch mesh sieve (British Standard Specification) and 1.6 parts by weight of graphite ground to pass a 100 mesh sieve (British Standard Specification) is added gradually and chlorination is continued until all the barium sulphate is converted to barium chloride. The reaction product contains 80% barium chloride and 20% potassium chloride.

Example II

The procedure described in Example I is varied by substituting for the initial fused melt of 4 parts by weight barium chloride and 6.5 parts by weight potassium chloride, a mixture of 12.5 parts by weight magnesium chloride and 4.25 parts by weight potassium chloride and by substituting for the mixture of 25 parts by weight barytes and 1.6 parts by weight graphite, a mixture of 19.5 parts by weight barytes and 1.3 parts by weight graphite, size grading of each being that specified in Example I. The reaction product contains 50% barium chloride, 37.5% magnesium chloride and 12.5% potassium chloride.

Example III

The procedure described in Example I is varied by substituting for the initial fused melt of barium chloride and potassium chloride, 10 parts by weight of barium chloride. The chlorination is conducted at a temperature of 950 to 1050° C. The reaction product is anhydrous barium chloride.

The barytes, no matter how coarse, should be kept in suspension, and this may be achieved in the absence of any other means of agitation by adjusting the velocity of the chlorine which is introduced into the molten bath in overall quantity greater than that needed for the stoichiometric proportion. The excess chlorine could be passed through another chlorinator and a better overall chlorine efficiency thereby achieved. It is also possible to collect this excess chlorine in the form of sulphuryl chloride, which may be sold, by combination with sulphur dioxide formed in the reaction.

I claim:
1. A process for the conversion of barytes to anhydrous barium chloride which consists in forming a molten liquid mass consisting of at least one chloride selected from the group consisting of the chlorides of the alkali metals and the chlorides of the alkaline earth metals, said mass also containing barytes and carbon passing gaseous chlorine into said liquid mass until a molten liquid reaction product is obtained which consists substantially solely of barium chloride and at least one chloride of said group.

2. A process as claimed in claim 1, wherein the molten chloride mass is barium chloride whereby the reaction product is anhydrous barium chloride.

3. A process as claimed in claim 1, wherein the molten chloride mass consists of potassium chloride and the proportion of barytes used in such that the reaction product is a mixture of barium chloride and potassium chloride and contains 50% to 90% of barium chloride.

4. A process as claimed in claim 1 wherein the molten chloride mass consists of barium chloride and potassium chloride and the proportion of barytes used is such that the reaction product is a mixture of barium chloride and potassium chloride and contains 50% to 90% of barium chloride.

5. A process as claimed in claim 1 wherein the molten chloride mass is sodium chloride and the proportion of barytes used is such that the reaction product is a mixture of barium chloride and sodium chloride and contains 50% to 90% of barium chloride.

6. A process as claimed in claim 1 wherein the molten chloride mass consists of barium chloride and sodium chloride and the proportion of barytes used is such that the reaction product is a mixture of barium chloride and sodium chloride and contains 50% to 90% of barium chloride.

7. A process as claimed in claim 1, wherein the carbon used in the reaction is powdered graphite.

8. A process as claimed in claim 1 in which the carbon is selected from the group consisting of anthracite and coke.

References Cited in the file of this patent

UNITED STATES PATENTS

| 1,146,491 | Gardner | July 13, 1915 |
| 1,167,061 | Grano | Jan. 4, 1916 |
| 2,111,236 | Ball | Mar. 15, 1938 |

FOREIGN PATENTS

| 138,486 | Great Britain | Feb. 12, 1920 |
| 536,649 | Germany | Oct. 24, 1931 |
| 545,768 | Great Britain | June 11, 1942 |
| 773,535 | Great Britain | Apr. 24, 1957 |

OTHER REFERENCES

Mellor: vol. 3, Longmans, Green & Co., 1923, p. 699 relied upon.